(12) United States Patent
Onfroy et al.

(10) Patent No.: US 11,215,456 B2
(45) Date of Patent: Jan. 4, 2022

(54) RESONATOR CONFIGURED TO BE INTEGRATED INTO AN INERTIAL ANGULAR SENSOR

(71) Applicants: SAFRAN, Paris (FR); COMMISSARIAT À L'ENERGIE ATOMIQUE ET AUX ENERGIES ALTERNATIVES, Paris (FR)

(72) Inventors: Philippe Onfroy, Moissy-Cramayel (FR); Vincent Ragot, Moissy-Cramayel (FR)

(73) Assignees: SAFRAN, Paris (FR); COMMISSARIAT À L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 69 days.

(21) Appl. No.: 16/609,054

(22) PCT Filed: Apr. 13, 2018

(86) PCT No.: PCT/FR2018/050940
§ 371 (c)(1),
(2) Date: Oct. 28, 2019

(87) PCT Pub. No.: WO2018/197777
PCT Pub. Date: Nov. 1, 2018

(65) Prior Publication Data
US 2020/0149890 A1    May 14, 2020

(30) Foreign Application Priority Data
Apr. 27, 2017   (FR) ........................... 1753688

(51) Int. Cl.
*G01C 19/5719* (2012.01)
*G01C 19/5712* (2012.01)

(52) U.S. Cl.
CPC ..... *G01C 19/5719* (2013.01); *G01C 19/5712* (2013.01)

(58) Field of Classification Search
CPC ................... G01C 19/5719; G01C 19/5712
See application file for complete search history.

(56) References Cited

U.S. PATENT DOCUMENTS

| | | | |
|---|---|---|---|
| 2004/0199347 A1 | 10/2004 | Painter et al. | |
| 2010/0218606 A1* | 9/2010 | Fell | G01C 19/5684 73/504.13 |
| 2016/0341551 A1 | 11/2016 | Cook et al. | |

FOREIGN PATENT DOCUMENTS

| | | |
|---|---|---|
| EP | 0 141 621 A2 | 5/1985 |
| FR | 2 983 574 | 6/2013 |

OTHER PUBLICATIONS

International Patent Application No. PCT/FR2018/050940, International Search Report and Written Opinion dated Jun. 19, 2018, 12 pgs. (relevance in citations and English translation of ISR).

* cited by examiner

*Primary Examiner* — Herbert K Roberts
*Assistant Examiner* — John M Royston
(74) *Attorney, Agent, or Firm* — Lathrop GPM LLP

(57) ABSTRACT

The invention concerns a resonator 1 configured to be integrated into an inertial angular sensor, said resonator 1 comprising at least one mass suspended by mechanical springs 5, a number N of pairs $P_i$ ($2 \leq i \leq N$) of electrostatic springs 50, said resonator 1 defining at least four axes of symmetry $S_1$, $S_2$, $S_3$ and $S_4$, characterized in that: each pair $P_i$ consists of two electrostatic springs 50 each having a privileged axis of action, these electrostatic springs 50 being positioned so that their respective axes form a right angle;

(Continued)

for at least one spring of one of the pairs and one spring of another pair, the angle formed by these two springs is equal to a predefined angle.

20 Claims, 5 Drawing Sheets

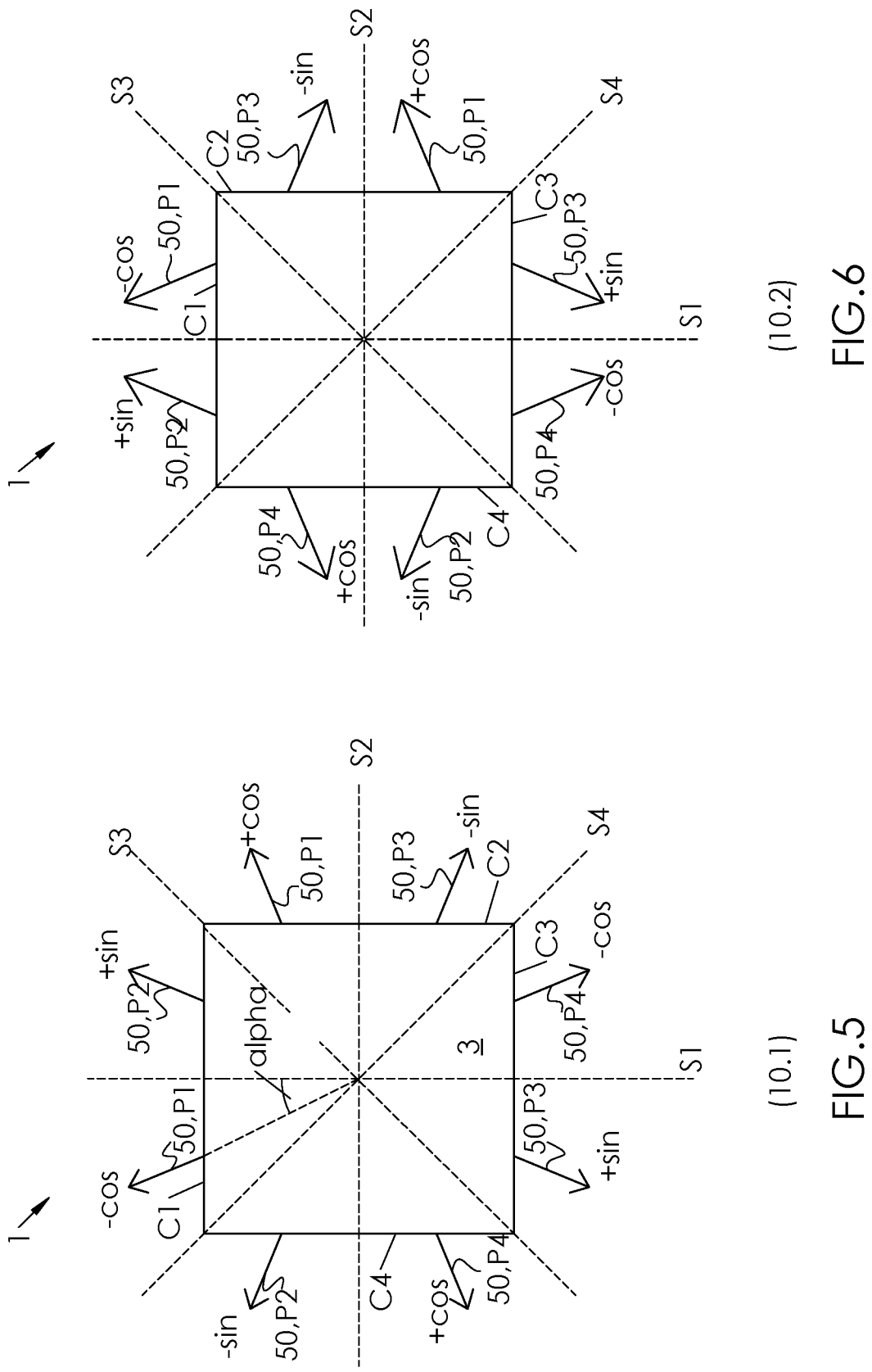

RESONATOR CONFIGURED TO BE INTEGRATED INTO AN INERTIAL ANGULAR SENSOR

CROSS-REFERENCE TO RELATED APPLICATIONS

This application is a 35 U.S.C. § 371 filing of International Application No. PCT/FR2018/050940 filed Apr. 13, 2018, which claims the benefit of priority to French Patent Application No. 1753688 filed Apr. 27, 2017, each of which is incorporated herein by reference in its entirety.

FIELD OF THE INVENTION

The present invention concerns the field of vibrating inertial angular sensors such as a gyrometer or a gyroscope, and more particularly micro-electro-mechanical sensors or MEMS (micro electro-mechanical system).

TECHNICAL BACKGROUND

The vibrating inertial angular sensors of the MEMS type can be categorized in two families according to the resonator structure. A resonator is a physical structure with mechanical resonance at a frequency known as the resonance frequency.

In the first family, the resonator is a deformable body, generally of revolution (ring, cylinder, hemisphere, disc). In the second family, the resonator consists of one or more undeformable masses connected to a support by elastic elements. The present invention concerns in particular a resonator belonging to the second family, and therefore in the form of a mass/spring system.

An inertial angular sensor generally includes actuators arranged to vibrate the resonator at a given resonance frequency, and detectors of resonator deformations. The actuators and the deformation detectors are generally mounted between the resonator and the support.

An inertial angular sensor of the MEMS type is used to measure an angular velocity (gyrometer mode) or an angular position (gyroscope mode).

To obtain a high-performance inertial sensor, it is important for the characteristics of the resonator to be isotropic, i.e. to be identical regardless of the orientation of the resonator vibration. In other words, there is no measurement error depending on the angular position of the vibration.

If we take the example of a gyroscope whose resonator has two specific modes whose vibration orientations are at 90 degrees, when a rotation is applied to the resonator support, the relative movement of the vibration with respect to the resonator is exactly opposite this rotation. To improve the accuracy of such a gyroscope, the stiffness and damping characteristics of the resonator must be isotropic, i. e. uniform in all directions.

For conventional MEMS sensor embodiments, the machining accuracy of the resonators is not sufficient to obtain the required stiffness isotropy. For example, for a resonator whose frequency is in the order of 10 kHz, the obtained frequency anisotropy can reach ±1%, i.e. ±100 Hz, while the functional requirement for the realization of a precise vibrating gyroscope requires an anisotropy much lower than ±1 Hz.

One objective is to propose a solution for correcting the frequency anisotropy of a suspended mass resonator to obtain a high-performance vibrating gyroscope.

A suspended mass resonator is a type of resonator known in the field of MEMS. It includes at least one mass/spring system with two orthogonal specific modes with close vibration frequencies for measuring axis rotations perpendicular to the vibration plane of the mass. The suspended mass has three degrees of freedom, including two translations and one rotation.

The French patent application FR 2 983 574 proposes a solution to balance a vibrating inertial angular sensor such as a vibrating gyroscope by making the damping anisotropy of the resonator more stable. The resonator described consists of two concentric masses of square annular shapes. Balance is thus obtained by correcting the dynamic unbalance resulting from the movement of the overall centre of gravity of the mass bodies at the vibration frequency. The correction is achieved by a special mechanical structure of the inertial angle sensor and an individual adjustment of the stiffness of the electrostatic springs. The electrostatic springs used have directions of action perpendicular to the sides of the masses, which does not allow compensation of frequency anisotropy in all directions.

SUMMARY

The present invention proposes a solution making it possible to stiffen the isotropic resonator in all directions, essentially by electrical and not mechanical adjustment, making this solution advantageously applicable to inertial angular sensors that can have mechanical structures and variable shapes.

The present invention concerns a resonator configured to be integrated into an inertial angular sensor, said resonator comprising at least one mass suspended by mechanical springs and having a number N of pairs $P_i$ ($2 \leq i \leq N$) of electrostatic springs, said resonator having at least four axes of symmetry $S_1$, $S_2$, $S_3$ and $S_4$, and having the following characteristics:
  each pair $P_i$ consists of two electrostatic springs each with a preferred axis D of action, these electrostatic springs being positioned so that their respective axes D form a right angle,
  for at least one electrostatic spring of one of the pairs and one electrostatic spring of another pair, the angle formed by these two electrostatic springs is equal to a predefined angle.

The invention may also comprise one or more of the following characteristics:
  the predefined angle is preferably 45 degrees,
  each pair $P_i$ is symmetrical to at least one other pair $P_j$ (with $j \neq i$) with respect to at least one of the axes of symmetry of $S_1$, $S_2$, $S_3 S_4$ the resonator,
  each electrostatic spring forms an alpha=90/N degree angle with at least two of the four axes of symmetry $S_1$, $S_2$, $S_3$ and $S_4$ of the resonator.
  in the case where N is strictly greater than two, each spring of each pair $P_i$ is symmetrical to at least two springs of other pairs, respectively with respect to one of the axes of symmetry $S_1$, $S_2$, $S_3$, $S_4$ of the resonator,
  in the case where N is strictly greater than two, each pair $P_i$ is symmetrical to two other pairs $P_j$, $P_k$ (with $j \neq i$, $k \neq i$, and $k \neq j$) respectively with respect to two of the symmetry axes $S_1$, $S_2$, $S_3$, $S_4$ of the resonator,
  in the case where N is strictly greater than two, each spring of each pair $P_i$ is symmetrical to four springs of other pairs, respectively with respect to one of the axes of symmetry $S_1$, $S_2$, $S_3$, $S_4$ of the resonator.

The invention secondly proposes an inertial angular sensor comprising a support, and a resonator as described above, at least one mass of which is connected to the support by the N pairs of electrostatic springs and by mechanical springs.

The inertial angular sensor may include one or more of the following characteristics:

the inertial angular sensor comprises an internal and an external mass coupled together by coupling springs, each of which is connected to the support by mechanical springs, and each of which is connected to the support by a number N of electrostatic springs.

the external mass is of a substantially square annular shape.

the internal and external masses have the same axes of symmetry.

Third, the invention proposes a method for correcting the stiffness of a resonator integrated in an inertial angular sensor as described above, including the steps of:

measurement of the resonator vibration frequencies for different vibration orientations using deformation sensors, determination, on the basis of these measurements, of the failing stiffness $K_U$ of the resonator, calculation, from the failing stiffness $K_U$, of tensions to be applied to a selection of springs, application of the calculated tensions on the selection of springs, repetition of the previous steps if the vibration frequency anisotropy of the resonator is greater than a threshold frequency anisotropy value.

According to a preferred embodiment of this method, the threshold frequency anisotropy value is 1 Hz.

The invention will be better understood and other details, characteristics and advantages of the invention will appear when reading the following description, which is given as a non-limiting example, with reference to the drawings.

BRIEF DESCRIPTION OF THE DRAWINGS

FIG. 5 is an illustration of a suspended mass resonator according to an exemplary embodiment of the present invention.

FIG. 6 is an illustration of a suspended mass resonator according to an exemplary embodiment of the present invention.

DETAILED DESCRIPTION

The present invention concerns a resonator 1 intended to be integrated into an inertial angular sensor 2, for example of the MEMS type.

Figure 1:
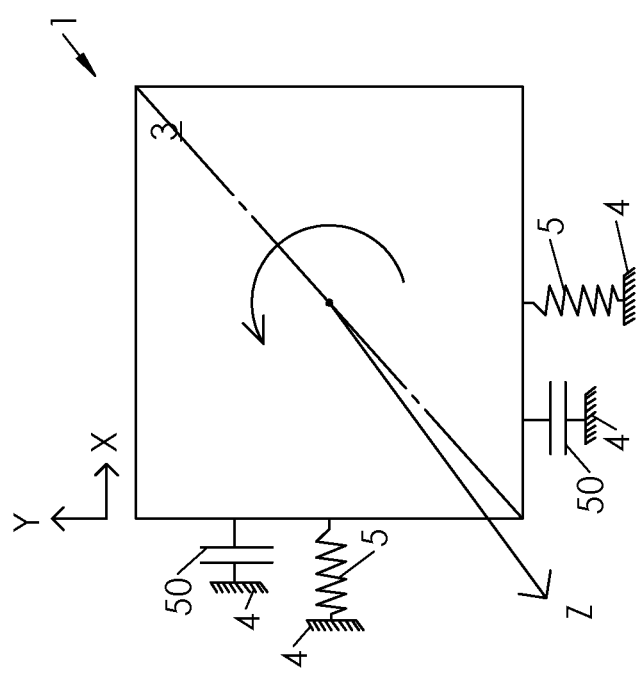
FIG. 1 is an example of a suspended mass resonator.

Reference is first made to FIG. 1 illustrating an example of a resonator with a mass 3 suspended on a support 4. This includes at least one vibrating mass 3 suspended by means of at least two orthogonal mechanical springs 5. The mass 3 has three degrees of freedom, i.e. two translations along the X and Y axes and one rotation about the Z axis normal to the X and Y axes. Every mechanical spring has a certain stiffness.

Figure 2:
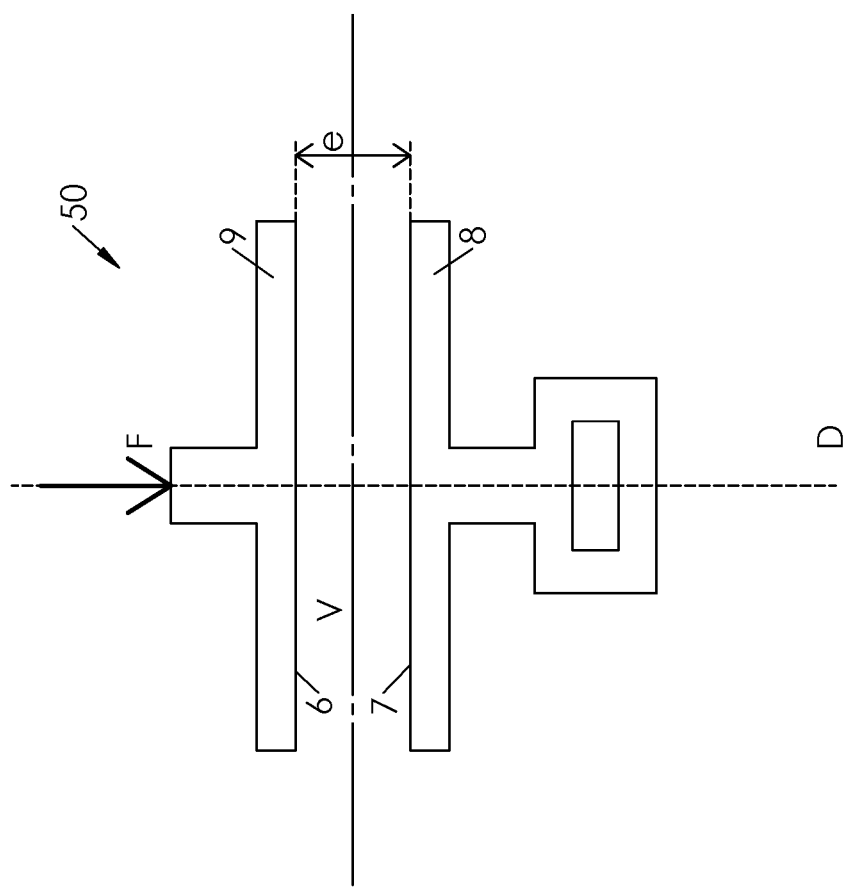
FIG. 2 is an illustration in the form of a simplified diagram of an electrostatic spring.

In parallel with the mechanical springs 5, electrostatic springs 50 are positioned, the operating principle of which is given in FIG. 2.

FIG. 2 is an illustration in the form of a simplified diagram of an electrostatic spring. As shown in FIG. 2, an electrostatic spring consists of at least two parallel surfaces 6 and 7 formed by a fixed electrode 8 and a movable electrode 9 whose air gap e, i.e. the gap between the two surfaces, varies under the effect of vibrations. The moving electrode is moved along a preferred deformation axis D of the spring 50. An electrostatic attraction between the two surfaces 6 and 7 is demonstrated by an electrostatic force F applied to the moving electrode 9. A direct voltage V is applied between the two surfaces. This voltage V generates a negative stiffness which is added to the mechanical stiffness of the mechanical spring in order to constitute the total stiffness of the equivalent spring.

The spring 50 shown in FIG. 2 is a simplified version. Indeed, the electrodes 8 and 9 can also have an interdigitated silicon comb shape for example. The operating principle remains the same as before.

One objective of this invention is to control the frequency of the vibration of the resonator 1 by adjusting the stiffness of the electrostatic springs 50.

A theoretical analysis shows that the $K_U$ failing stiffness of a resonator consisting of a suspended mass as shown in FIG. 1 is a function whose variable is twice the angular position of the vibration, measured about the axis perpendicular to the plane in which the mass 3 moves. This function is illustrated by the following equation (1):

$$K_U(\theta) = k(1 + \delta k \cos(2\theta)) \tag{1}$$

Where δk is half the relative deviation of the stiffness $K_x$—stiffness in the X-direction and $K_y$, stiffness in the Y direction; k is the average value of the stiffness $K_x$ and $K_y$.

In the particular cases where 0 degrees θ is used, the failing stiffness $K_U$ can be expressed by the equation (2), and in the cases where 90 degrees θ is used, $K_U$ can be expressed by the equation (3):

$$K_U(0) = k(1 + \delta k) = K_x \tag{2}$$

$$K_U(90) = k(1 - \delta k) = K_y \tag{3}$$

The angle θ is the angle between the direction of movement of the mass 3 and the X axis of the plane X,Y in which the mass 3 moves. It is used to define the initial orientation of the failing stiffness $K_U$.

Misalignment of the mechanical springs 5 of FIG. 1 and/or the use of springs 5 on two axes introduces a sin(2θ) component.

The electrostatic springs 50 must therefore be positioned on the resonator 1 in such a way that the failing stiffness can be compensated for regardless of its initial orientation, i.e. regardless of the angle θ. This leads to the need to be able to compensate for both the cosine cos(2θ) and sinus sin(2θ) components of the failing stiffness $K_U$. Stiffness $K_U$ being a variable 2θ function, the transition from a cosine component to a sinus component is achieved by a physical rotation of 45 degrees.

However, electrostatic springs 50 only create negative stiffness. For this reason, at least one pair P of electrostatic springs 50 whose deformation axes form a right angle is required to increase or decrease the stiffness $K_x$ or $K_y$.

Figure 3:
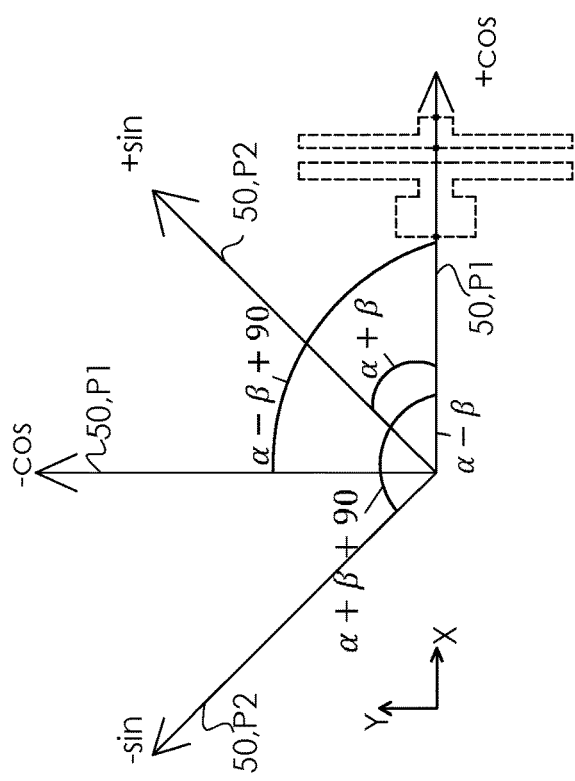
FIG. 3 is an illustration of an exemplary embodiment of the invention with four electrostatic springs.

FIG. 3 is an illustration of an exemplary embodiment of a resonator with four electrostatic springs. In the case of FIG. 3, the resonator 2 comprises two pairs of electrostatic springs 50 offset at an angle different from 0 and 90 degrees from the X axis, i.e. two pairs $P_1$ and $P_2$ of electrostatic springs 50 offset in pairs, for example by 45 degrees, each pair consisting of two springs 50 whose preferred axes of action form a right angle, as illustrated in FIG. 3. To simplify the representation of the springs 50 in the respective positions and orientations thereof, each spring 50 is represented by an arrow. This configuration allows compensation independent of the sine and cosine components. It is intended to be possible to use four electrostatic springs, each of which forms an angle $\alpha-\beta, \alpha+\beta, \alpha-+90$, and $\alpha+\beta+90$ respectively, with the X axis, with $0<\beta\leq 45$. This configuration allows frequency anisotropy compensation in all directions.

In the particular case of FIG. 3, $\alpha$ and $\beta$ are each 22.5 degrees. The value $\beta$ is not imposed, but 22.5 degrees is an optimal value to compensate for frequency anisotropy in all directions, and is a preferred parameter.

At the end of each arrow, the nature of the compensated component is indicated (-cos for a negative cosine component, +cos for a positive cosine component, -sin for a negative sinus component, +sin for a positive sinus component).

In this FIG. 3, the spring 50 of the pair $P_1$ compensating for a positive cosine component was deliberately represented in dotted lines to show the position and the orientation thereof corresponding to its representation as an arrow.

For a given resonator 1, a finite number of axes of symmetry can be defined according to its shape, for example four axes of symmetry noted $S_1$, $S_2$, $S_3$ and $S_4$. These axes of symmetry coincide with the axes of symmetry of the mass or masses of the resonator.

For reasons of symmetry, the present invention provides for the use of a number N of pairs $P_i$ (N≥2, 1≤i≤N) of springs 50 according to the shape of the resonator 1, regularly spaced at the same angle. An advantageous exemplary embodiment with eight electrostatic springs 50 is illustrated in FIG. 4, FIG. 5 and FIG. 6, corresponding to four pairs noted $P_1$, $P_2$, $P_3$ and $P_4$.

Figure 4:
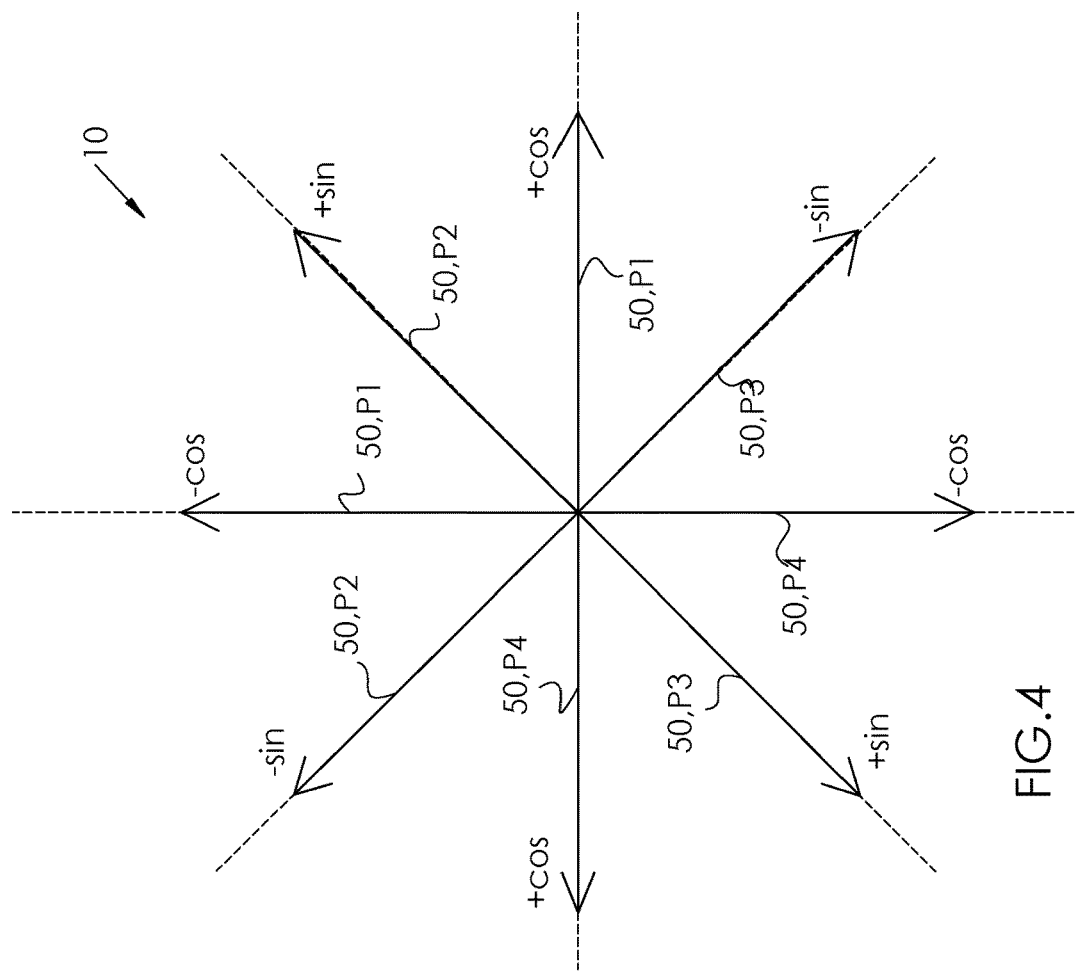
FIG. 4 is an illustration of a pattern formed by eight electrostatic springs, according to an exemplary embodiment of the present invention.

FIG. 4 is an illustration of a pattern formed by eight electrostatic springs, according to an exemplary embodiment of the present invention. According to this embodiment, the eight electrostatic springs 50 are spaced 45 degrees apart and together define a pattern 10 whose orientation with respect to the axes of symmetry $S_1$, $S_2$, $S_3$ and $S_4$ of the resonator 1 is free, which leads to a large number of possible topologies.

For a resonator with a square shape, as shown in FIG. 5, a preferential orientation is obtained by rotating the pattern of FIG. 4 by an angle of 22.5 degrees, which leads to a constant angle of 22.5 degrees between each electrostatic spring 50 and two of the four axes of symmetry ($S_1$, $S_2$, $S_3$ and $S_4$) of the resonator 1. In FIG. 5, the electrostatic springs 50 define a pattern noted 10.1. In this configuration, the springs 50 are positioned so that they can be grouped into an N number of pairs $P_i$ (or N≥2, 21≤i≤N,) springs 50 whose preferred axes of action form a right angle, and so that each spring 50 forms an angle of 90/N degrees with at least two of the axes of symmetry of the resonator 1.

On the other hand, from the pattern 10.1 of FIG. 5, it is possible to switch—for each side $C_1$, $C_2$, $C_3$ and $C_4$ the resonator 1—two springs 50, which leads to the pattern 10.2 of FIG. 6. The pattern 10.2 is defined by all the electrostatic springs 50 of FIG. 6. Each pattern 10.1 and 10.2 provides a topology of the springs 50, indicating the positions and relative orientations thereof.

Thus, the resonator 1 comprises at least a mass 3, a number N of pairs $P_i$ (N≥2, 1≤i≤N) of electrostatic springs 50, and at least four axes of symmetry $S_1$, $S_2$, $S_3$ and $S_4$. In the exemplary embodiments illustrated in FIG. 5 and FIG. 6, N is four (N=4).

The embodiments of the resonator 1, illustrated in FIG. 5 and FIG. 6, have the following common characteristics:
- each pair $P_i$ consists of two electrostatic springs 50, each with a preferred axis D of action, these electrostatic springs 50 being positioned so that their respective axes D form a right angle,
- for at least one spring of one of the pairs and one spring of another pair, the angle formed by these two springs is equal to a predetermined angle, and for example 45 degrees.
- each pair $P_i$ is symmetrical by at least one other pair $P_j$ (with j≠i) with respect to at least one of the axes of symmetry of $S_1$, $S_2$, $S_3 S_4$ the resonator 1,
- each spring 50 of each pair $P_i$ is symmetrical to at least two springs 50 of other pairs, respectively with respect to one of the axes of symmetry $S_1$, $S_2$, $S_3$, $S_4$ of the resonator 1.

The embodiment of the resonator 1, presented in FIG. 5, has the following particular characteristics:
- each pair $P_i$ is symmetrical to two other pairs $P_j$, $P_k$ (with j≠i k≠i, and k≠j) respectively with respect to two of the axes of symmetry $S_1$, $S_2$, $S_3$, $S_4$ of the resonator 1,
- each spring 50 of each pair $P_i$ is symmetrical to four springs 50 of other pairs, respectively with respect to one of the axes of symmetry $S_1$, $S_2$, $S_3$, $S_4$ of the resonator 1.
- each spring 50 of each pair $P_i$ forms an alpha=90/N degree angle with at least two of the four axes of symmetry of the resonator 1.

The embodiments of the resonator 1 presented in FIG. 5 and FIG. 6 allow all-round compensation (in all directions) of the frequency anisotropy of the resonator 1. The present invention also provides for an inertial angular sensor 2 equipped with a resonator 1 as described above. This inertial angle sensor 2 includes a support 4, and a resonator 1 whose mass(es) 3 is/are connected to the support by the N pairs of electrostatic springs and by mechanical springs 5.

Figure 7:
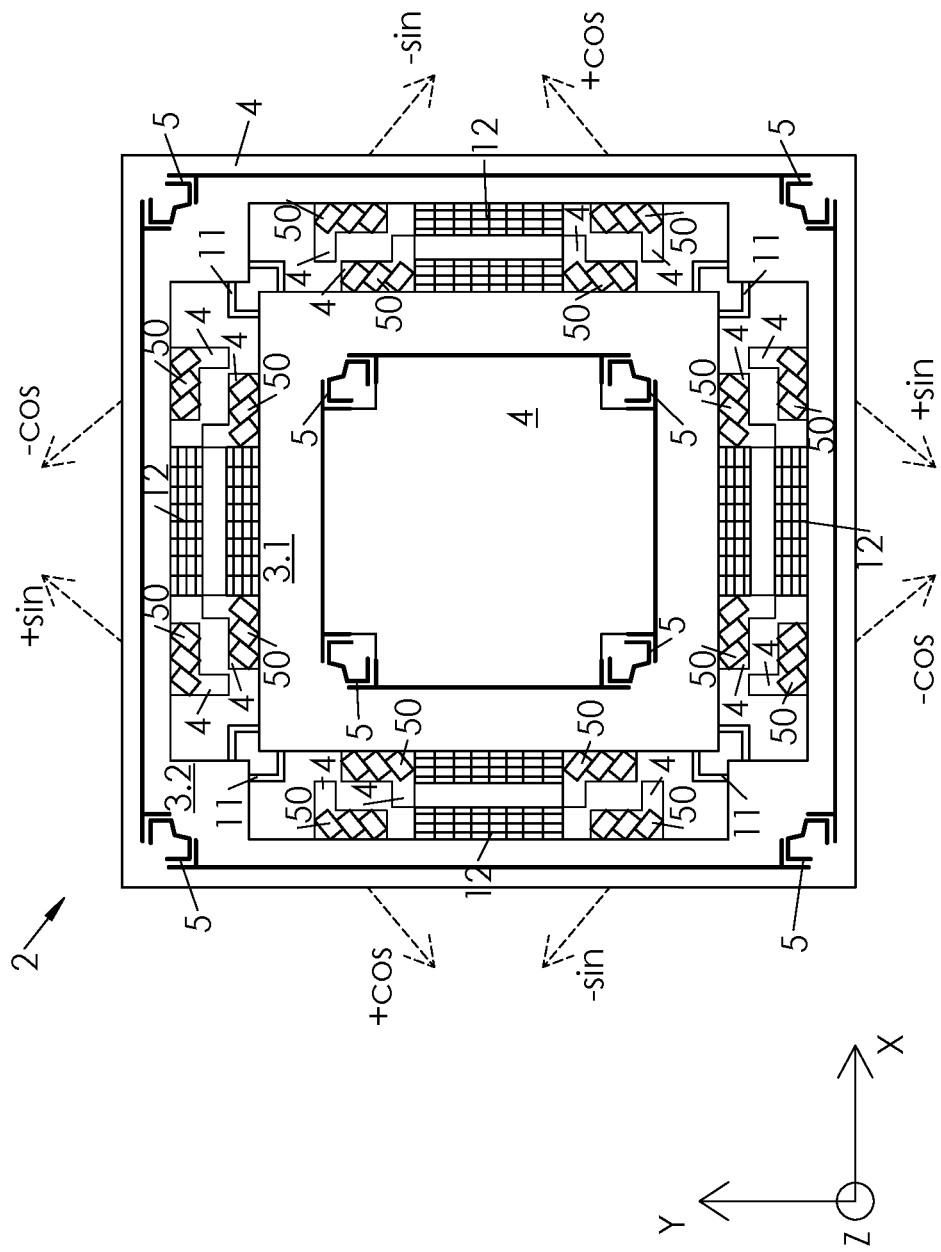
FIG. 7 is an illustration of an inertial sensor equipped with a resonator according to an exemplary embodiment.

According to one embodiment illustrated in FIG. 7, the sensor 2 has two concentric masses (3.1 the internal mass) and 3.2 (the external mass) each connected by mechanical springs 5—each consisting here of two flexible blades positioned at 90 degrees—to a support 4. Coupling springs 11 connect the two masses 3.1 and 3.2 together. Actuators 50 are mounted between each mass 3.1 and 3.2 the support 4. Each mass 3.1 and 3.2 has three degrees of freedom in the plane, i.e. two translations (along the X and Y axes) and one rotation (about an axis normal to the X and Y plane).

The masses 3.1 and 3.2 have coinciding axes of symmetry, forming the axes of symmetry $S_1$, $S_2$, $S_3$, $S_4$ of the sensor 2, said masses having identical natural frequencies.

A vibration mode used corresponds to opposite displacements of the two masses. This vibration can have any orientation. For each of the masses 3.1 and 3.2, an electrostatic spring topology 50 such as the one described by the pattern 10.2 of FIG. 6 was used.

In the exemplary embodiment of FIG. 7, there are four pairs of electrostatic springs 50 for each suspended mass 3.1 and 3.2. According to a preferred embodiment, the masses 3.1 and 3.2 are of substantially square annular shapes.

However, this is not an obligation for the internal mass 3.1 which can be square and solid.

Figure 8:
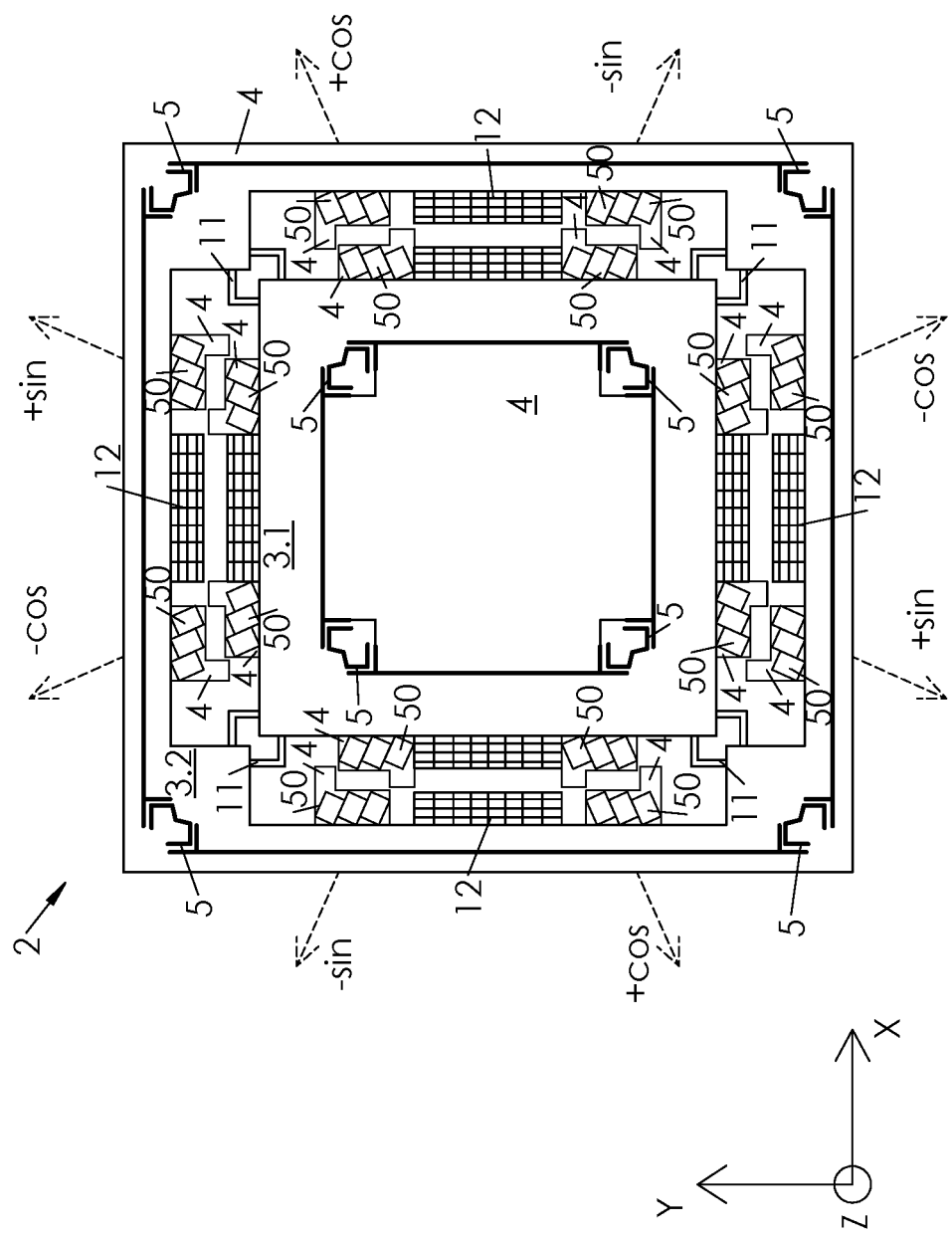
FIG. 8 is an illustration of an inertial sensor equipped with a resonator according to an exemplary embodiment.

In FIG. 8, another embodiment of an inertial angular sensor 2 is represented in which the topology of electrostatic springs 50 used is described by the pattern 10.1 of FIG. 5. In addition, it is possible, according to another possible embodiment, to use a spring topology defined by a different pattern for each mass 3.1 and 3.2, for example the pattern 10.1 for the mass 3.1 and the pattern 10.2 for the mass 3.2 or the opposite.

In the embodiment of the sensor 2 of FIG. 7, the resonator 1 comprises two mass/spring systems, the first system comprising the mass 3.1 and associated mechanical springs 5, and the second system comprising the mass 3.2 and associated mechanical springs 5.

The electrostatic springs 50 have a known structure in the form of comb electrodes, the teeth of which are interleaved. The combs of the electrostatic springs 50 have an operation mode with a variable air gap.

This invention also provides for a method for correcting the stiffness of the resonator 1 integrated in an inertial angular sensor as described above, and including the steps of:
- measurement of the resonator vibration frequency for different vibration orientations, using deformation sensors 12 positioned between the electrostatic spring blocks 50, as shown in FIG. 7 and FIG. 8.
- determination, from these measurements, of the amplitude of the anisotropy and its orientation, i.e. the failing stiffness $K_U$ of the resonator,
- calculation of the tensions to be applied to some springs to compensate for the sinus and cosine components of the failing stiffness of the resonator,
- if the vibration frequency anisotropy of the resonator is greater than a predetermined value, preferably 1 Hz, the previous steps are repeated.

The above procedure makes it possible to make a resonator 1 isotropic in stiffness, by an electrical adjustment and not a mechanical adjustment, intended to be integrated into an inertial angular sensor 2 in the form of a mass/spring system.

The invention claimed is:

1. An inertial angular sensor comprising a support, characterized in that it comprises a resonator, said resonator comprising at least two masses suspended by mechanical springs, a number N of pairs $P_i(2 \leq i \leq N)$ of electrostatic springs, said resonator defining at least four axes of symmetry $S_1$, $S_2$, $S_3$ and $S_4$, characterized in that:
   - each pair $P_i$ consists of two electrostatic springs each having a preferred axis D of action, these electrostatic springs being positioned such that the respective axes D thereof form a right angle,
   - for at least one spring of any of the pairs and at least one spring of any other pair, the angle formed by these two springs is equal to a predefined angle,
   - said at least two masses being connected to the support by the at least some of the N pairs of electrostatic springs and by at least some of the mechanical springs, said at least two masses of the resonator comprising an internal mass and an external mass coupled together by coupling springs, each mass being connected to the support by mechanical springs, and each mass being connected to the support by a number N of electrostatic springs.

2. The inertial angular sensor according to claim 1, characterized in that the predefined angle is 45 degrees.

3. The inertial angular sensor according to claim 2, characterized in that each pair $P_i$ is symmetrical to at least one other pair $P_j$(with $j \neq i$) with respect to at least one of the axes of symmetry $S_1$, $S_2$, $S_3$ and $S_4$ of the resonator.

4. The inertial angular sensor according to claim 1, characterized in that each pair $P_i$ is symmetrical to at least one other pair $P_j$(with $j \neq i$) with respect to at least one of the axes of symmetry $S_1$, $S_2$, $S_3$ and $S_4$ of the resonator.

5. The inertial angular sensor according to claim 4, characterized in that each spring of each pair $P_i$ forms an alpha=90/N degree angle with at least two of the four axes of symmetry $S_1$, $S_2$, $S_3$ and $S_4$ of the resonator.

6. The inertial angular sensor according to claim 1, characterized in that each spring of each pair $P_i$ forms an alpha=90/N degree angle with at least two of the four axes of symmetry $S_1$, $S_2$, $S_3$ and $S_4$ of the resonator.

7. The inertial angular sensor according to claim 6, characterized in that the external mass has a substantially square annular shape.

8. The inertial angular sensor according to claim 4, characterized in that the external mass has a substantially square annular shape.

9. The inertial angular sensor according to claim 2, characterized in that the external mass has a substantially square annular shape.

10. The inertial angular sensor according to claim 1, characterized in that the external mass has a substantially square annular shape.

11. The inertial angular sensor according to claim 10, characterized in that the masses have the same axes of symmetry.

12. The inertial angular sensor according to claim 6, characterized in that the masses have the same axes of symmetry.

13. The inertial angular sensor according to claim 4, characterized in that the masses have the same axes of symmetry.

14. The inertial angular sensor according to claim 2, characterized in that the masses have the same axes of symmetry.

15. The inertial angular sensor according to claim 1, characterized in that the masses have the same axes of symmetry.

16. A method for correcting the stiffness of a resonator integrated in an inertial angular sensor according to claim 1, comprising the steps of:
   - measurement of the vibration frequencies of the resonator for different vibration orientations, using deformation sensors,
   - determination, on the basis of these measurements, of the failing stiffness $K_U$ of the resonator wherein $K_U$ is a function of stiffness at an angular vibration orientation around an axis perpendicular to a plane of movement,
   - calculation, from the failing stiffness $K_U$, of the tensions to be applied to a selection of electrostatic springs,
   - application of the calculated tensions on the selection of springs,
   - repetition of the previous steps if the vibration frequency anisotropy of the resonator is greater than a threshold frequency anisotropy value.

17. The method according to claim 16, characterized in that the threshold frequency anisotropy value is 1 Hz.

18. A method for correcting the stiffness of a resonator integrated in an inertial angular sensor according to claim 4, comprising the steps of:

measurement of the vibration frequencies of the resonator for different vibration orientations, using deformation sensors, determination, on the basis of these measurements, of the failing stiffness $K_U$ of the resonator wherein $K_U$ is a function of stiffness at an angular vibration orientation around an axis perpendicular to a plane of movement, calculation, from the failing stiffness $K_U$, of the tensions to be applied to a selection of electrostatic springs, application of the calculated tensions on the selection of springs, repetition of the previous steps if the vibration frequency anisotropy of the resonator is greater than a threshold frequency anisotropy value.

19. A method for correcting the stiffness of a resonator integrated in an inertial angular sensor according to claim 6, comprising the steps of:

measurement of the vibration frequencies of the resonator for different vibration orientations, using deformation sensors, determination, on the basis of these measurements, of the failing stiffness $K_U$ of the resonator wherein $K_U$ is a function of stiffness at an angular vibration orientation around an axis perpendicular to a plane of movement, calculation, from the failing stiffness $K_U$, of the tensions to be applied to a selection of electrostatic springs, application of the calculated tensions on the selection of springs, repetition of the previous steps if the vibration frequency anisotropy of the resonator is greater than a threshold frequency anisotropy value.

20. A method for correcting the stiffness of a resonator integrated in an inertial angular sensor according to claim 10, comprising the steps of:

measurement of the vibration frequencies of the resonator for different vibration orientations, using deformation sensors, determination, on the basis of these measurements, of the failing stiffness $K_U$ of the resonator wherein $K_U$ is a function of stiffness at an angular vibration orientation around an axis perpendicular to a plane of movement, calculation, from the failing stiffness $K_U$, of the tensions to be applied to a selection of electrostatic springs, application of the calculated tensions on the selection of springs, repetition of the previous steps if the vibration frequency anisotropy of the resonator is greater than a threshold frequency anisotropy value.

* * * * *